(12) United States Patent
Stumm et al.

(10) Patent No.: US 6,491,292 B2
(45) Date of Patent: Dec. 10, 2002

(54) PISTON AND CYLINDER ASSEMBLY

(75) Inventors: Rolf Stumm, Koblenz (DE); Rolf Mintgen, Thür (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/801,989

(22) Filed: Mar. 8, 2001

(65) Prior Publication Data

US 2001/0022133 A1 Sep. 20, 2001

(30) Foreign Application Priority Data

Mar. 10, 2000 (DE) ........................................ 100 11 767

(51) Int. Cl.[7] .................................................. F16F 9/00
(52) U.S. Cl. ...................................................... 267/225
(58) Field of Search ................................ 267/174, 175, 267/170, 177, 224, 225, 237, 221, 251, 252, 289, 291

(56) References Cited

U.S. PATENT DOCUMENTS

| 2,756,071 A | | 7/1956 | Riva ........................... 280/283 |
| 5,096,168 A | * | 3/1992 | Takehara et al. ............ 267/152 |
| 5,263,695 A | * | 11/1993 | Bianchi ....................... 267/225 |

FOREIGN PATENT DOCUMENTS

| DE | 919 150 | 10/1954 | |
| DE | 89 08 133.1 | 10/1989 | ........... B60G/15/02 |
| DE | 42 34 217 | 4/1994 | ......... B60G/17/048 |
| WO | WO 98/40232 | 9/1998 | ........... B60G/11/14 |

* cited by examiner

Primary Examiner—Jack Lavinder
Assistant Examiner—C. T. Bartz
(74) Attorney, Agent, or Firm—Cohen, Pontani, Lieberman & Pavane

(57) ABSTRACT

A piston-cylinder assembly has a principal structural group including a cylinder and another principal structural group including a piston rod which has a part-length axially displaceably arranged within the cylinder. The piston rod adopts a default stroke position without external displacement forces acting on the piston-cylinder assembly, the default position being determined by positioning equipment. The positioning equipment includes at least one energy accumulator which acts in the inward and outward movement directions of the piston rod as a function of the stroke position of the piston rod. The at least one energy accumulator includes a tension spring arrangement and a compression spring arrangement. Each of the tension spring arrangement and the compression spring arrangement has a first end which acts in a stationary manner on one of the first and second principal groups and a second end which acts on the other of the first and second principal groups at least with the piston rod outside the default stroke position.

7 Claims, 1 Drawing Sheet

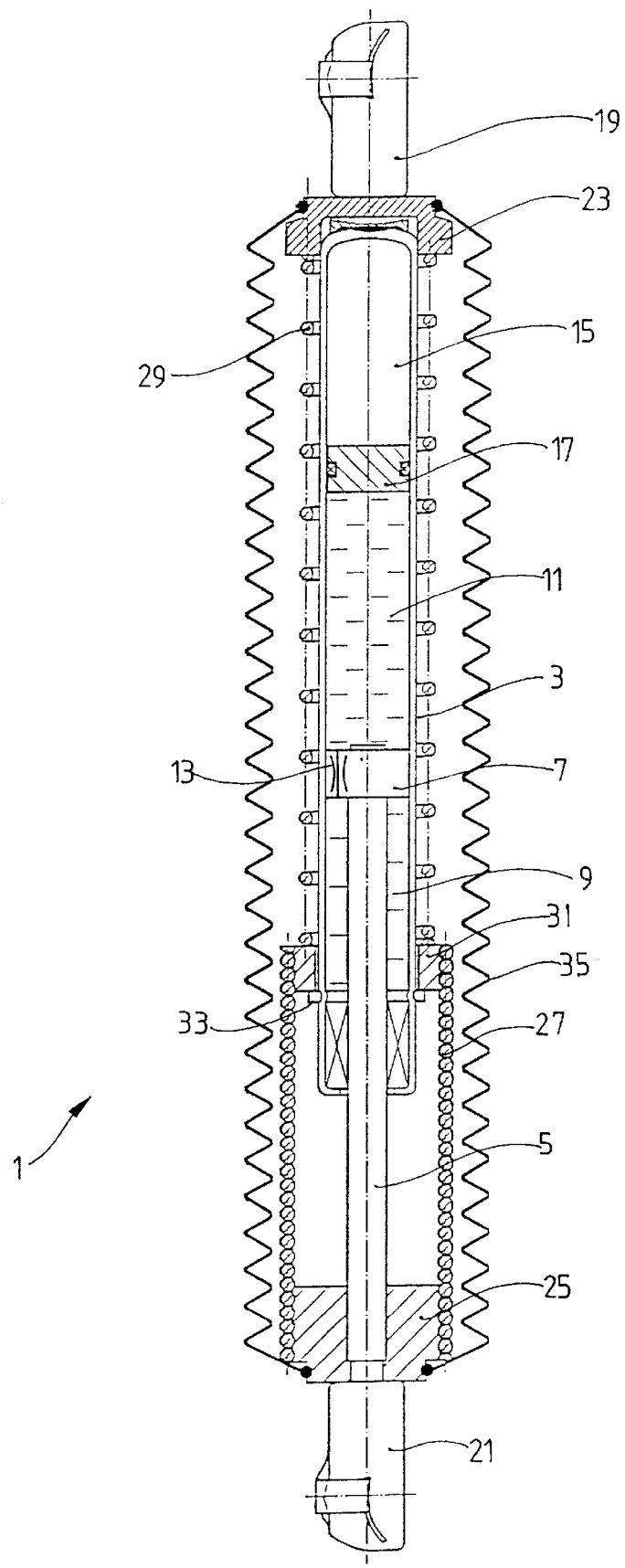

PISTON AND CYLINDER ASSEMBLY

BACKGROUND OF THE INVENTION

1. Field of the Invention

The invention relates to a piston-cylinder assembly including a cylinder and a piston rod which is axially displaceably arranged in the cylinder, the piston rod adopting a stroke position determined by positioning equipment when no external forces are acting on the piston-cylinder assembly.

2. Description of the Related Art

There are applications in which a piston-cylinder assembly is required to adopt a particular stroke position without external force. An example of such an application is when the piston-cylinder assembly is connected to a switching lever which adopts a central switching position and is moved to a switching point by an actuating force in a first direction. When the actuating force is removed, the piston-cylinder assembly is to resume the central switching position. In the event of an opposed actuating force in a second direction, the piston-cylinder assembly is also required to resume the original central switching position after actuation of the switching lever. Of course, the piston-cylinder assembly may be required to aim for a position other than the central switching position after actuation, as defined by a specific application.

For such applications, a piston-cylinder assembly is disclosed in reference WO 98/40232 as a bidirectionally acting damper with a self-centering mechanism. The principal structural groups of this damper include a cylinder and a piston rod which is axially displaceably arranged relative to the cylinder with a part-length of the piston rod within the cylinder. The piston rod adopts a stroke position which is determined by positioning equipment when no external displacement forces act on the assembly. The positioning equipment includes an energy accumulator which acts in the inward and outward movement directions of the piston rod as a function of the stroke position of the piston rod.

In this damper, an assembly problem exists in that a circumferential bead is required to be produced as a final step of the method on a transmission pipe as part of the positioning equipment. The bead serves as a stop for the entrainment of a sliding sleeve. The production of the bead introduces a the manufacturing risk that the shape of the transmission pipe will be adversely influenced here which may cause functional problems of the piston-cylinder assembly. In addition, inaccuracies regarding the intended centered stroke position may be expected.

A further disadvantage of this damper in comparison with a conventional damper is that the transmission pipe introduces a substantial additional weight. The transmission pipe has to transmit tensile and compressive forces and is dimensioned accordingly. Furthermore, the transmission pipe has a length approximately corresponding to the sum of the length of the cylinder and half the inward travel of the piston rod. Such a long and rigid pipe is necessarily heavy.

Furthermore, both the inner diameter and the outer diameter of the two sliding sleeves have to be produced to very narrow tolerances in order to achieve sufficiently accurate guidance. If the production tolerances selected are too wide, jamming forces or skewed positions of the transmission pipe may arise. However, very narrow tolerances seriously increase costs.

SUMMARY OF THE INVENTION

It is an object of the present invention to produce a piston-cylinder assembly having two principal structural groups including a cylinder and a piston rod which adjust automatically to a default stroke position and can be produced at a reduced production cost by comparison with the prior art.

The object of the present invention is met by a piston-cylinder assembly having a tension spring arrangement and a compression spring arrangement used as energy accumulators. Each of the compression spring arrangement and the tension spring arrangement have a first end that acts in a stationary manner on one of the two principal structural groups and a second end that is operatively connected to the other principal group when the piston rod is outside the default stroke position.

The present invention does not require a transmission pipe and thereby obviates that problems of the prior art associated therewith.

Accordingly, the number of parts has been reduced compared to the prior art and the use of a tension spring arrangement and a compression spring arrangement allows different restoring forces to be achieved for different piston rod positions.

The compression spring arrangement may be arranged outside the cylinder such that its second end is operatively connected via a switching device supporting the forces of the compression and tension spring arrangements with one of the two principal structural groups. The switching device effects the separation of the effect of the force on the piston-cylinder assembly as a function of the piston rod position, the compression spring arrangement not being active in the area of action of the tension spring arrangement.

To this end, the switching device has a sliding sleeve which is axially movably arranged relative to the two principal groups. The sliding sleeve blocks the effect of the force of one of the two spring arrangements via a stop from a default stroke position of the piston rod.

The two spring arrangements may engage on the same sliding sleeve. Ultimately, there is only one moving element, in comparison with the three moving elements known from the above-mentioned prior art.

To simplify the structural arrangement, the sliding sleeve is mounted to be axially movable on the cylinder. The sliding sleeve has a fit connection only in the area of contact with the cylinder. Double fits are not required because a transmission pipe is not required.

To achieve reliable restoration of the piston rod into the default stroke position, the compression spring arrangement is always under a prestress, independently of the stroke position of the piston rod.

The stop is formed on the piston rod outside the envisaged stroke range of a piston arranged on the piston rod so that the fixing of the stop to the cylinder does not exert any influence on the track properties of the cylinder for the piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

In the drawing:

The single FIGURE is a longitudinal sectional view of a piston-cylinder assembly according to an embodiment of the present invention.

DETAILED DESCRIPTION OF THE PRESENTLY PREFERRED EMBODIMENTS

The FIGURE shows a piston-cylinder assembly 1 according to an embodiment of the present invention. A piston rod 5 is axially movably arranged within a cylinder 3. The piston rod 5 and the cylinder 3 form first and second principal structural groups of the piston-cylinder assembly 1. A piston 7 is fixed to the end of the piston rod 5 arranged in the cylinder 3 and divides the cylinder 3 into two working spaces 9, 11 that are filled with a hydraulic damping medium. The piston 7 has a throttle device 13 which allows the passage of damping medium between the two working spaces 9, 11. The cylinder 3 additionally includes a compensation space 15 which is separated in a fluid-tight manner from the working space 11 by an axially movable separating piston 17. The compensation space 15 is filled with a pressurized gas, or alternatively with a helical compression spring, so that the hydraulic damping medium in the working spaces 9, 11 is under an operating pressure. The compensation space 15 is intended to compensate the volume of the piston rod 5 moving in and out of the cylinder 3.

A connection member 19 is attached to the cylinder 3 and another connection member 21 is attached to the free end of the piston rod 5. Securing means 23 for a compression spring arrangement 29 are arranged proximate the connection member 19 and securing means 25 for a tension spring arrangement 27 are arranged proximate the connection member 21. The securing means 23 comprises a spring plate on which the compression spring arrangement 29 is supported.

A sliding sleeve 31 is axially displaceably mounted on the cylinder 3. The sliding sleeve 31 forms a second spring plate for the compression spring arrangement 29, so that a first end of the compression spring arrangement 29 is supported on the securing means 23 and a second end of the compression spring arrangement 29 is supported on the sliding sleeve 31. A stop 33 is used on which the sliding sleeve 31 is supported from a default stroke position of the piston rod 5 so that the compression spring arrangement 29 is prestressed in any stroke position of the piston rod 5. The sliding sleeve 31 and the stop 33 form a switching device. The stop 33 is located outside the normal stroke range of the piston 7 in a bead on the cylinder 3 which fixes a piston rod guide means axially within the cylinder 3.

The tension spring arrangement 27 is likewise operatively connected to the sliding sleeve 31. In the default stroke position shown which is always adopted if no external force is acting on the piston-cylinder assembly 1 the tension spring arrangement 27 adopts the shortest operating length and the compression spring arrangement 29 adopts its maximum operating length. The forces of both the tension and compression spring arrangements 27, 29 are supported on the stop 33 in the default stroke position.

If the piston rod 5 is moved in the outward movement direction from this default stroke position by an external force, the sliding sleeve 31 is prevented from moving relative to the cylinder 3 by the stop 33. Accordingly, the tension spring arrangement 27 is stretched by the outward-moving piston rod 5 and exerts a restoring force on the piston rod 5 so that the piston rod 5 moves back to the default stroke position when the external force is removed.

During an inward movement of the piston rod 5, the tension spring arrangement 27 adopts its minimum operating length starting from the default stroke position. That is, the tension spring arrangement is fully compressed. The sliding sleeve 31 and the securing means 25 are displaced synchronously relative to the cylinder 3 toward the connection member 19 as the piston rod moves into the cylinder 3. The tension spring arrangement 27 fails to exert any forces at all and only the compression spring arrangement 29 is effective in this state. Accordingly, the sliding sleeve 31 and the stop 33 together form a switching device that allows the tension and compression spring arrangements 27, 29 to become effective as a function of the stroke position of the piston rod 5.

Functionally, the securing means 23, 25 with the respective compression and tension spring arrangements 29, 27 form, in conjunction with the sliding sleeve 31 and the stop 33, a positioning device for the piston-cylinder assembly.

The cylinder 3, the piston rod 5, and the securing means 23, 25 are screened against external influences by an elastic protective bellow 35. The piston rod 5 is additionally protected during an insertion movement by the tension spring arrangement 27 which is fully compressed and thereby forms a closed-walled tube.

Although the piston-cylinder assembly 1 is shown as a damper in the FIGURE, the invention is not limited to piston-cylinders comprising dampers. The present invention relates to any piston-cylinder assembly having a first and second principal groups in which the piston rod is urged toward a defualt stroke position in the absence of external forces on the piston-cylinder assembly.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder assembly, comprising:
    a cylinder;
    a piston rod having a part-length that is axially displaceably arranged within said cylinder;
    positioning equipment operatively arranged for exerting a force on said piston-cylinder assembly so that said piston rod adopts a default stroke position relative to said cylinder in the absence of external displacement forces on said piston-cylinder assembly, said positioning equipment comprising at least one energy accumulator acting between said cylinder and said piston rod in inward and outward movement directions of said piston rod as a function of a stroke position of said piston rod, said at least one energy accumulator including a tension spring arrangement, said tension spring arrangement comprising a spring constructed and attached within the piston-cylinder assembly so that it may be utilized only in a tension producing manner; and a compression spring arrangement, said compression spring arrangement comprising a spring constructed and attached within the piston-cylinder assembly so that it may be utilized only in a compression producing manner; wherein each of said tension spring arrangement and said compression spring arrangement comprises a first end acting at one of said cylinder and said piston rod and a second end in a working connection with the other of said cylinder and piston rod via an intermediate device when said piston rod is moved outside of said default stroke position.

2. The piston-cylinder assembly of claim 1, wherein said intermediate device comprises a switching device operatively arranged for supporting the forces of said tension and compression spring arrangements on said one of said cylinder and said piston rod, wherein said compression spring arrangement is arranged outside said cylinder and said second end of said compression spring arrangement is in a working connection with said other one of said cylinder and said piston rod via said switching device.

3. The piston-cylinder assembly of claim 2, wherein said switching device comprises a sliding sleeve axially movably arranged relative to said cylinder and said piston rod and a stop, wherein said sliding sleeve blocks the effect of the force of one of said tension and compression spring arrangements via said stop starting from the default stroke position of said piston rod.

4. The piston-cylinder assembly of claim 3, wherein the forces of both said tension and compression spring arrangements are applied to said sliding sleeve at the default stroke position.

5. The piston-cylinder assembly of claim 3, wherein said sliding sleeve is axially movably mounted on said cylinder.

6. The piston-cylinder assembly of claim 1, wherein said compression spring arrangement is continuously under a prestress, independently of the stroke position of said piston rod.

7. The piston-cylinder assembly of claim 3, wherein a piston is arranged on said piston rod for axial movement in said cylinder and said stop is formed on said cylinder outside a stroke range of said piston.

\* \* \* \* \*